United States Patent [19]

Yasuda

[11] Patent Number: 5,323,220
[45] Date of Patent: Jun. 21, 1994

[54] PAPER FEEDING METHOD AND PRINTING APPARATUS WHICH CONTINUOUSLY FEEDS OUT SHEETS OF PAPER BY SELECTING ONE OF A PLURALITY OF PAPER FEED CASSETTES

[75] Inventor: Megumi Yasuda, Kawasaki, Japan

[73] Assignee: Fujitsu Limited, Kanagawa, Japan

[21] Appl. No.: 9,247

[22] Filed: Jan. 26, 1993

[30] Foreign Application Priority Data

Feb. 6, 1992 [JP] Japan .................. 4-020386

[51] Int. Cl.$^5$ .......................................... G03G 15/00
[52] U.S. Cl. ......................... 355/317; 271/9; 346/134
[58] Field of Search .......... 355/316, 317, 309; 271/9; 346/134; 395/111

[56] References Cited

U.S. PATENT DOCUMENTS

| | | | |
|---|---|---|---|
| 4,918,489 | 4/1990 | Inage et al. | 355/309 |
| 4,956,651 | 9/1990 | Emori | 346/134 X |

FOREIGN PATENT DOCUMENTS

| | | |
|---|---|---|
| 58-63974 | 4/1983 | Japan . |
| 63-106249 | 5/1988 | Japan . |
| 1-181680 | 7/1989 | Japan .................. 355/317 |
| 02-116571 | 5/1990 | Japan . |
| 3-119375 | 5/1991 | Japan .................. 355/317 |

*Primary Examiner*—Joan H. Pendegrass
*Attorney, Agent, or Firm*—Staas & Halsey

[57] ABSTRACT

A printing apparatus used in a computer system selects either one of a plurality of paper feed cassettes and prints image data onto a cut sheet supplied from the selected cassette. Paper sensors are individually attached at predetermined positions which are located just after a plurality of paper feed cassettes at the same distance. The paper conveying times from the attaching positions of the paper sensors to a print start request position have been preset. When the cassette is switched during the printing operation, the predetermined paper feed timing time is changed. When switching from the cassette at a near position to the cassette at a remote position, the paper feed timing time is set to a short time and the paper feeding operation from the cassette on the switching side is instructed. When switching from the cassette at a remote position to the cassette at a near position, the predetermined paper feed timing time is set to a long time and the paper feeding operation from the cassette on the switching side is instructed.

15 Claims, 10 Drawing Sheets

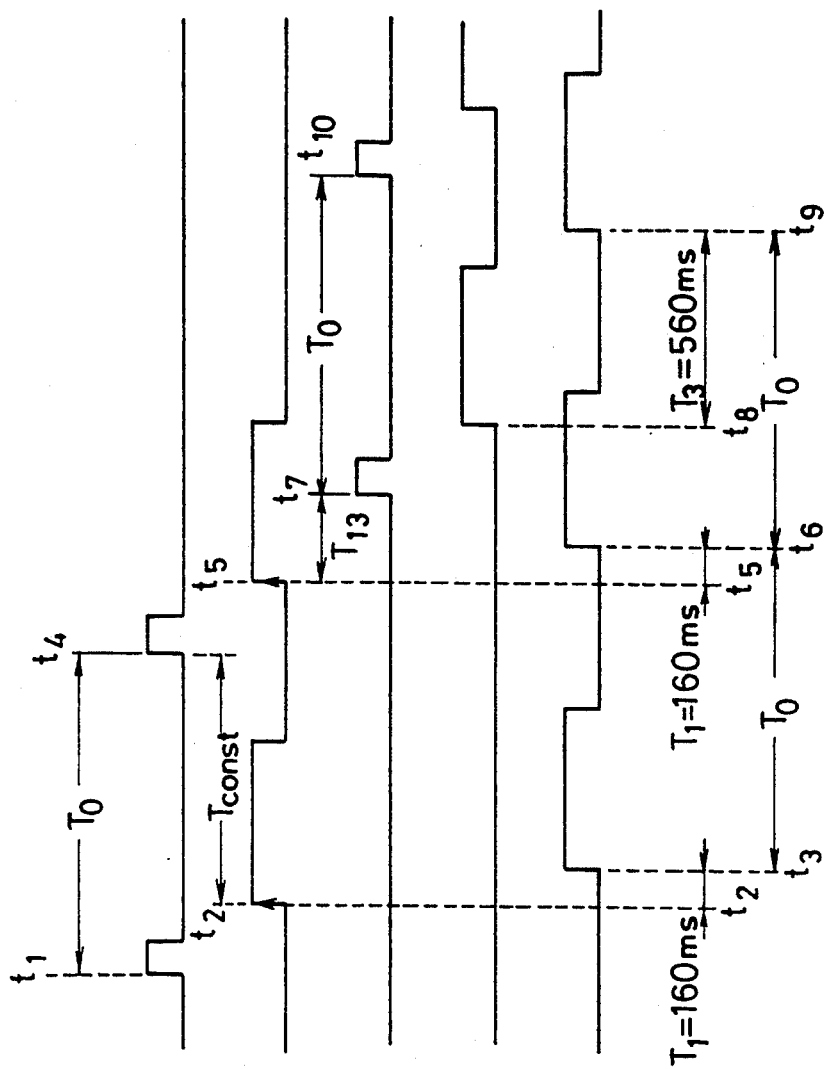
FIG. 9A PICKUP INSTRUCTION SIGNAL FROM THE UPPER STAGE
FIG. 9B DETECTION SIGNAL OF PAPER SENSOR 30-1
FIG. 9C PICKUP INSTRUCTION SIGNAL FROM THE LOWER STAGE
FIG. 9D DETECTION SIGNAL OF PAPER SENSOR 30-3
FIG. 9E WRITE TIMING SIGNAL

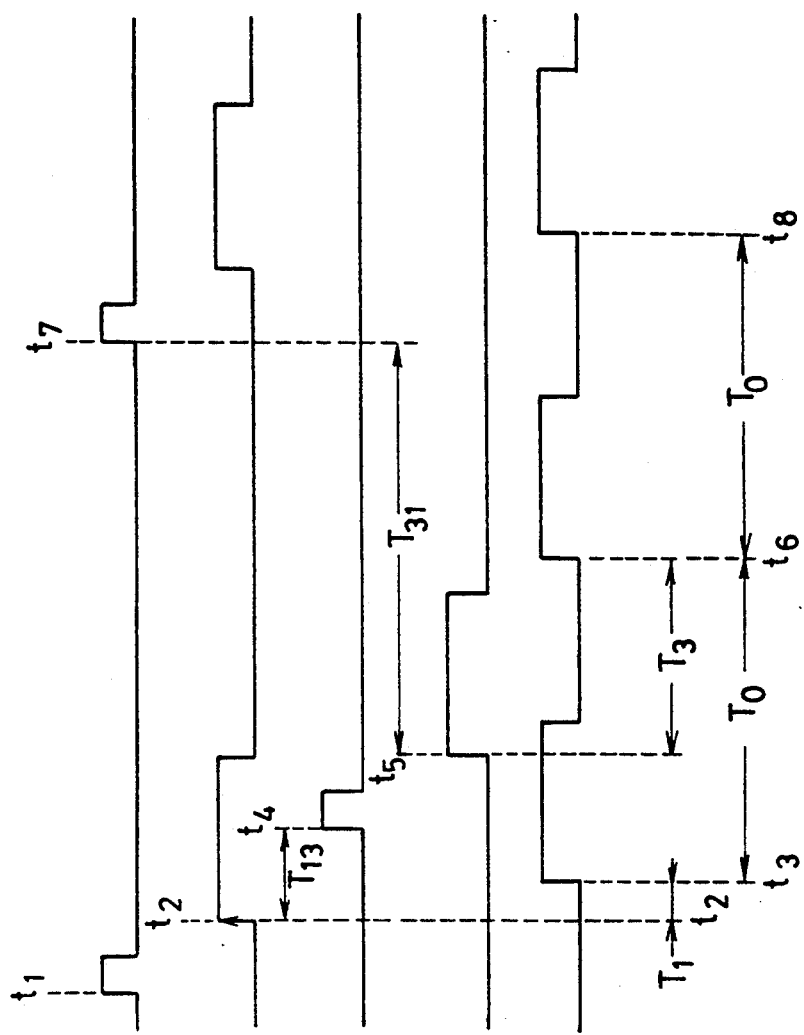

PAPER FEEDING METHOD AND PRINTING APPARATUS WHICH CONTINUOUSLY FEEDS OUT SHEETS OF PAPER BY SELECTING ONE OF A PLURALITY OF PAPER FEED CASSETTES

BACKGROUND OF THE INVENTION

1. Field of the Invention

The present invention relates to a paper feeding method and a printing apparatus which are used in a computer system and, more particularly, to a paper feeding method of a print paper and a printing apparatus for continuously feeding out sheets by selecting one of a plurality of paper feed cassettes upon printing.

2. Description of the Related Art

For instance, in a laser printer which uses cut sheets and is used as a printing apparatus of a computer system, a plurality of paper feed cassettes are provided in accordance with the sizes of the cut sheets. One of the paper cassettes is selected in accordance with the designation of the paper size from a host computer, the cut sheets of the designated size are fed to a printing section, and image data is printed onto the paper every sheet.

In the laser printer, when the cut sheet arrives at a predetermined position in front of a copy transfer position, a drum writing operation to form a latent image onto a photo sensitive drum is started. For instance, in the case where the paper feed cassettes are enclosed to three stages of the upper stage, middle stage, and lower stage, a time which is required until the cut sheet is fed from each stage to the starting position of the drum writing operation differs.

In case of selecting the lower stage paper feed cassette which needs a long paper feed distance, therefore, a conveying time which is required until the paper reaches the starting position of the drum writing operation is long. A processing time to print becomes slow by only a time corresponding to such a long conveying time, so that it is demanded to improve such a drawback.

FIG. 1 (PRIOR ART) shows a schematic construction of a conventional printing apparatus and relates to a laser printer 10 as an example.

In FIG. 1, an upper stage cassette 28-1, a middle stage cassette 28-2, and a lower stage cassette 28-3 are provided as paper feed cassettes. Papers are fed to a printing position of a printer having a photo sensitive drum 32 by a conveying path shown by a broken line. In the printing operation, a laser beam 36 is emitted from a semiconductor laser 34 of an optical system 20, and a latent image of a print pattern is formed onto the charged photo sensitive drum 32 by a drum unit 38 by the irradiation of the laser beam. A toner is subsequently supplied by a developer 42 and the latent image on the drum is developed. After that, the developed image is transferred onto the cut sheet by a copy transfer section 46. Finally, the transferred image on the paper is fixed by a fixing unit 50 and the paper is fed onto an output tray 52.

A paper sensor 200 is provided at a predetermined position in front of the printing position on the conveying path of the cut sheet. When the paper sensor 200 detects the paper, the writing operation to form a latent image onto the photo sensitive drum 32 is started at a predetermined timing.

In such a conventional printing apparatus using cut sheets as mentioned above, however, the forming process of the latent image onto the photo sensitive drum 32 is started at the timing based on a detection signal of the paper sensor 200 provided on the conveying path after the cut sheet fed from either one of a plurality of paper cassettes 28-1 to 28-3 merged, so that there is a problem such that the processing speed becomes slow in dependence on differences of the paper cassettes 28-1 to 28-3.

FIGS. 2A to 2D show the operation to switch from the upper stage cassette 28-1 to the lower stage cassette 28-3.

In a paper feed state in which the upper stage cassette 28-1 has been selected, when the paper is fed from the upper stage cassette 28-1 on the basis of a pickup instruction signal which is generated at time $t_1$ in FIG. 2A, a sensor output of the paper sensor 28-1 is obtained at time $t_2$ in FIG. 2B after the elapse of time $T_{10}$. Synchronously with the sensor output, the writing operation onto the photo sensitive drum 32 is started as shown by a write timing in FIG. 2D.

It is now assumed that the writing operation onto the drum is executed at time $t_4$ by a paper feeding operation based on a pickup instruction signal generated at time $t_3$ and, after that, the feed cassette to feed a paper is switched to the lower stage cassette 28-3. Since the paper feeding position becomes long due to the switching of the paper cassette, a time which is required until the sensor output is obtained at time $t_6$ in FIG. 2B after the paper was fed from the lower stage cassette 28-3 on the basis of a pickup instruction signal at time $t_5$ in FIG. 2C becomes long to be $T_{20}$, so that the write start timing to the drum in FIG. 2D is also delayed.

That is, although the writing operation onto the drum is executed every period $T_{100}$ which is determined by times $t_2$ to $t_4$ in case of feeding the papers from the upper stage cassette 28-1, when the feed cassette is switched to the lower stage cassette 28-3, the papers are fed every period $T_{200}$ of times $t_4$ to $t_6$ and a writing period to the drum becomes long by only a time corresponding to a long distance of the paper feed cassette which is used, so that a processing speed decreases.

SUMMARY OF THE INVENTION

According to the present invention, the highest processing speed can be always obtained even when conveying distances of the papers to the printing position, namely, conveying times differ due to the selection of a plurality of paper feed cassettes.

As a feed control method of a print paper for this purpose, according to the present invention, a paper sensor is arranged at the position corresponding to the same distance on a paper conveying path before papers fed from a plurality of paper feed cassettes merge. A conveying time which is required until the cut sheet is moved from the sensor attaching position to a predetermined conveying position at which the start of the printing operation is required is preset for each of a plurality of paper feed means. For instance, in the case where the paper feed cassettes are constructed by three stages of the upper stage, middle stage, and lower stage, conveying times which are required from the attaching positions of the paper sensors provided in correspondence to those cassettes at positions before the papers fed therefrom merge until a predetermined position after the papers merged are set to $T_1$, $T_2$, and $T_3$, respectively. There are relations of $T_1 < T_2 < T_3$ among the set conveying times.

In the paper feed control, first, one of a plurality of paper feed cassettes is selected and a cut sheet is fed onto the conveying path. The cut sheets fed onto the conveying path are fed along the conveying paths provided every cassette and merge. After image data is printed onto the papers by a printing mechanism, the papers are delivered to the outside of the printing apparatus. In this case, when a detection signal is obtained from the paper sensor corresponding to the selected paper feed cassette, a preset paper conveying time corresponding to the selected cassette is read out and monitored. After the elapse of the set time, the start of the printing operation is required to the printing mechanism. The printing mechanism prints a print pattern onto the conveyed cut sheet on a paper unit basis on the basis of an instruction of the print start request.

In the paper feed control, when the selection of one of the paper feed cassettes is maintained, the next paper feed instruction is generated after the elapse of a predetermined time $t_{const}$ from a time point at which the detection signal is derived from the corresponding paper sensor.

On the other hand, in the case where the feed cassette is switched to another paper feed cassette during the feeding operation of the cut sheet from the special paper feed cassette, the predetermined time $T_{const}$ is changed so as to maintain the same printing period as that before the feed cassette is switched, and the paper feed after completion of the switching is instructed at a different timing.

For instance, in case of switching from the upper stage paper feed cassette whose set conveying time is short to be $T_1$ to the middle stage paper feed cassette whose set conveying time is long to be $T_2$, an instruction to feed the paper from the middle stage cassette to be switched is generated after the elapse of a time $$(T_{const}) - (T_2 - T_1)$$

after the apparatus had received the paper detection signal of the cut sheet before switching from the paper sensor of the upper stage cassette. On the contrary, in case of switching from the middle stage cassette to the upper stage cassette, the instruction to feed the paper from the upper stage cassette to be switched is generated after the elapse of a time $$(T_{const}) + (T_2 - T_1)$$

after the detection signal of the paper sensor of the middle stage cassette had been received.

Upon switching of the paper feed cassette, one of a plurality of paper feeding means is selected on the basis of the paper size designated from an upper-order apparatus and the paper feed is instructed.

As a printing mechanism, for instance, there is used a laser printer mechanism in which a latent image optically formed on a photo sensitive drum is copy transferred onto a cut sheet by an electrophotographic method. As a print start request, the start to form a latent image is requested to the printing mechanism.

According to the printing apparatus of the present invention, by individually providing paper sensors at the positions of the same distance just after the paper feed cassettes, the paper feed is independently detected every paper. The corresponding set times are read out and monitored from the conveying times $T_1$, $T_2$, and $T_3$ which are different every paper feeding mode which has been preset from the sensor set position. After the elapse of the set time, the printing operation is started. For instance, the writing operation onto the photo sensitive drum is started. Therefore, even when the paper feed cassettes differ, for example, a drum writing period can be set to a predetermined period. On the other hand, even when the paper feed cassette is switched during the printing operation, the drum writing period can be set to a predetermined period. Thus, the paper can be fed and printed at the highest processing speed of the printing apparatus.

The above and other objects, features, and advantages of the present invention will become more apparent from the following detailed description with reference to the drawings.

BRIEF DESCRIPTION OF THE DRAWINGS

FIGS. 9A to 9E are timing charts for explaining the paper feeding operation in case of switching from an upper stage paper feed cassette to a lower stage paper feed cassette; and FIGS. 10A to 10E are timing charts for explaining the paper feeding operation in case of alternately switching between the upper stage paper feed cassette and the lower stage paper feed cassette every paper.

DETAILED DESCRIPTION OF THE PREFERRED EMBODIMENT

Figure 1:
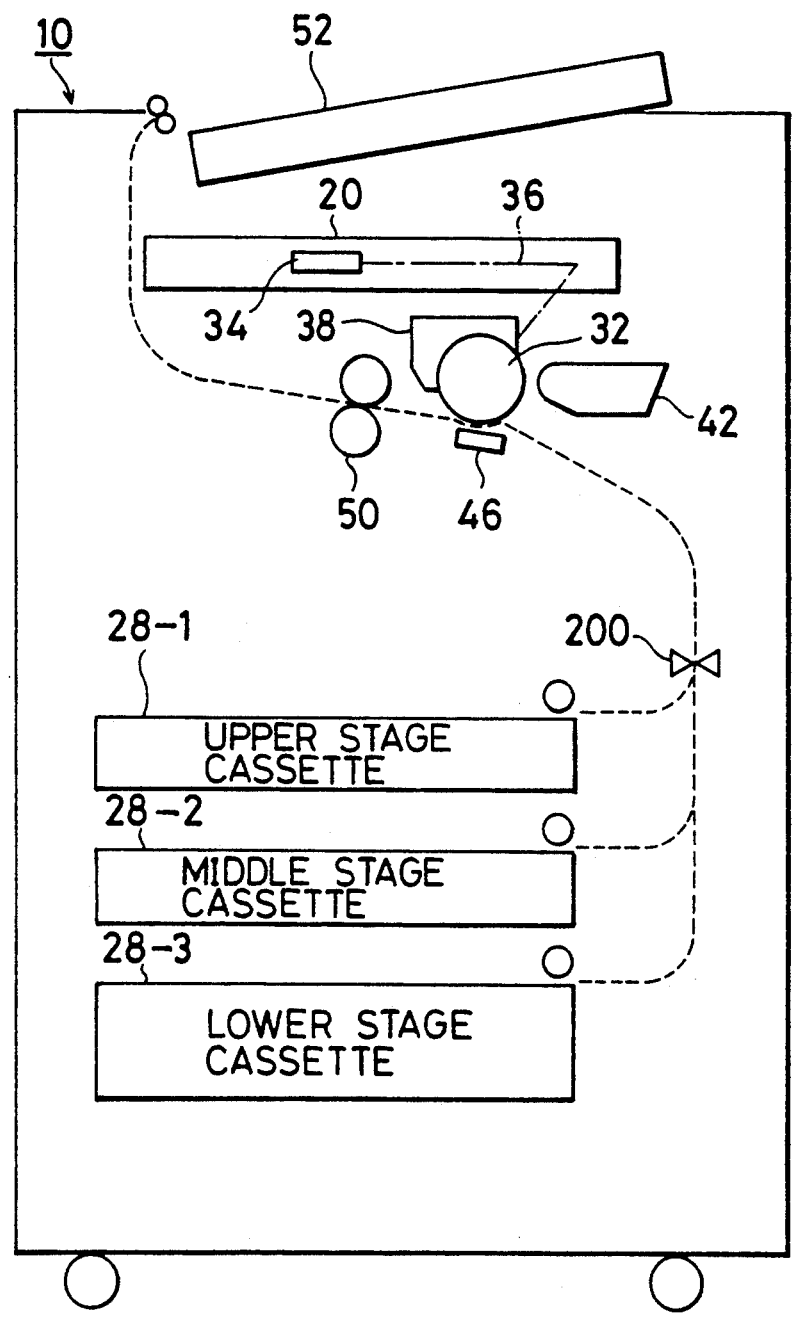
FIG. 1 (PRIOR ART) is a schematic explanatory diagram of a conventional printing apparatus.
Figure 2:
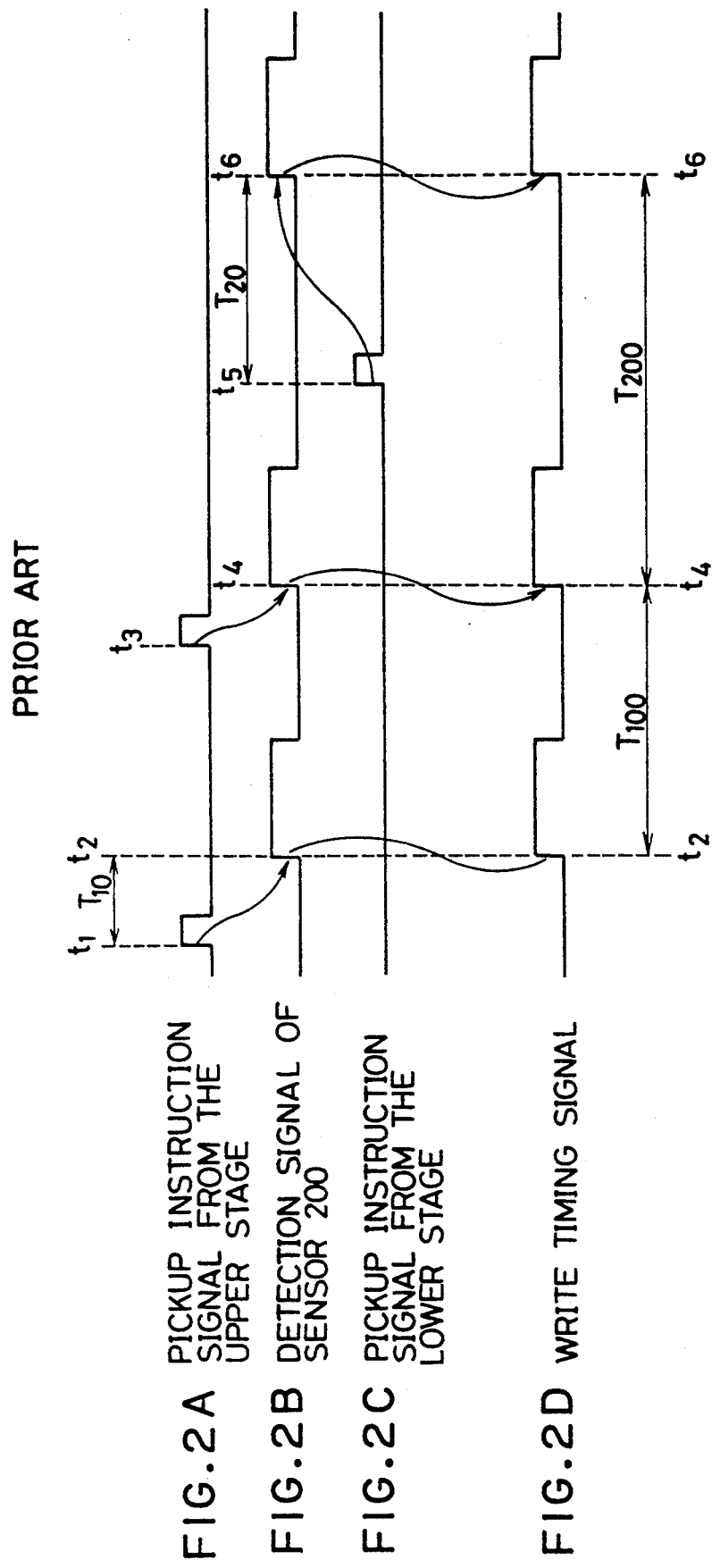
FIGS. 2A, 2B, 2C, and 2D (PRIOR ART) are timing charts for explaining the operation of the conventional printing apparatus.
Figure 3:
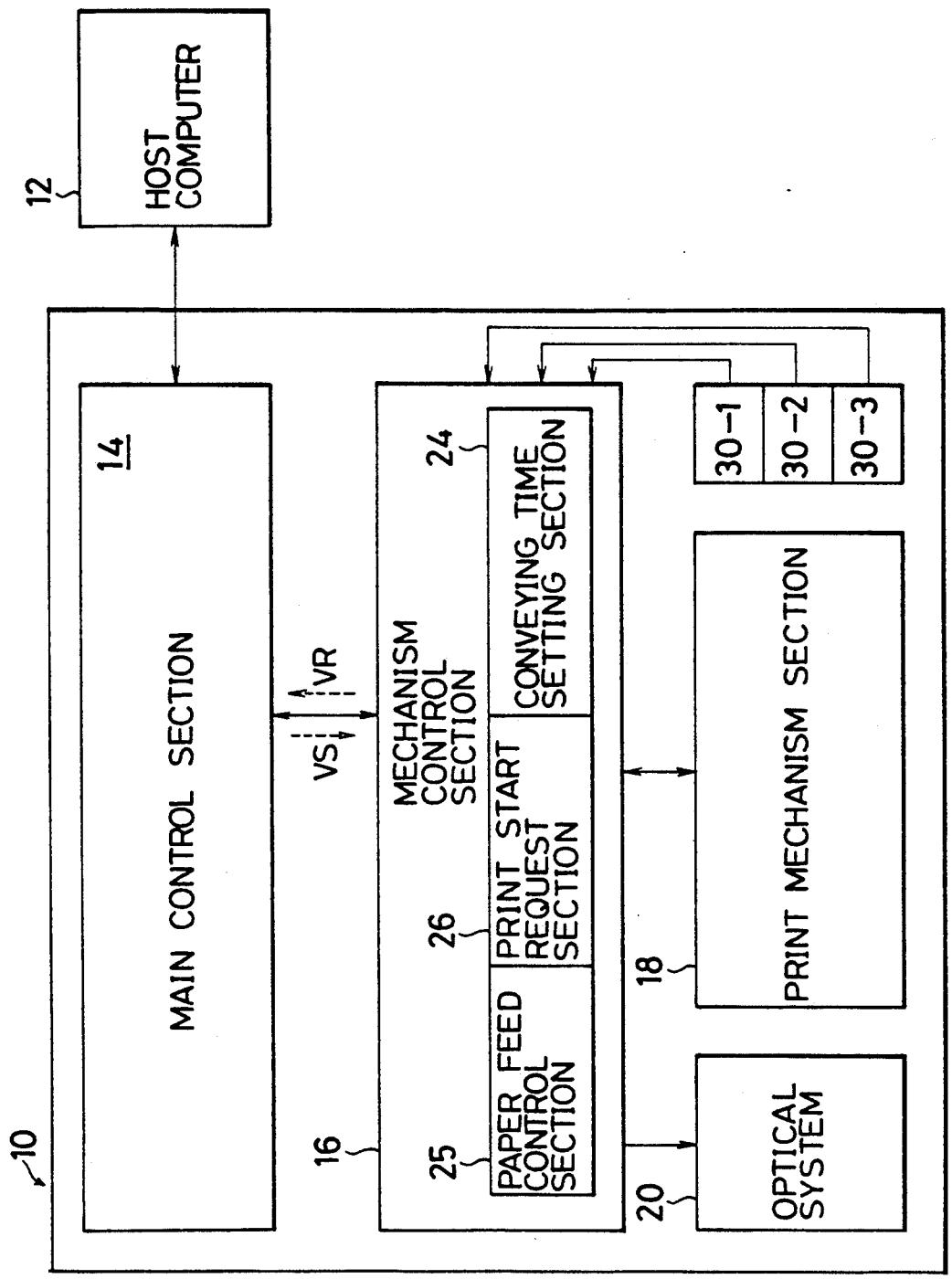
FIG. 3 is a functional block diagram of a printing apparatus of the present invention.

In FIG. 3, the laser printer 10 comprises a main control section 14 and a mechanism control section 16. The main control section 14 is connected to a host computer 12 as an upper-order apparatus and receives a print command including the designation of a paper size and print data from the host computer 12. The main control section 14 subsequently notifies a printing state and an error or the like to the host computer 12.

The mechanism control section 16 executes the printing operation on the basis of the result of the decoding of the print command from the main control section 14. A print mechanism section 18 is provided in correspondence to the main control section 14 and the laser printer is used as a print mechanism section 18. Therefore, the optical system 20 is provided. As will be obviously explained hereinlater, the print mechanism section 18 has, for instance, an upper stage cassette, a middle stage cassette, and a lower stage cassette as paper feeding apparatuses. Paper sensors 30-1, 30-2, and 30-3 are provided in correspondence to those paper feed cassettes. Photo sensors, mechanical contact sensors, or the like are used as paper sensors 30-1 to 30-3.

Further, a conveying time setting section 24, a paper feed control section 25, and a print start request section 26 which are realized by a program control are provided in the mechanism control section 16.

The paper conveying times $T_1$, $T_2$, and $T_3$ which are required from the attaching positions of the paper sensors 30-1, 30-2, and 30-3 to the request positions to start of the printing to the print mechanism section 18, namely, the request positions to start the writing onto the photo sensitive drum to form a latent image have been preset in the conveying time setting section 24, respectively.

The paper feed control section 25 selects either one of the upper stage cassette, middle stage cassette, and lower stage cassette on the basis of the designation of the paper size from the main control section 14 and generates a pickup instruction signal to the print mechanism section 18 synchronously with the printing operation, thereby instructing the paper feeding operation. The paper feed control by the paper feed control section 25 will be further clearly understood by the following description.

When the paper detection signal is derived from one of the paper sensors 30-1 to 30-3, the print start request section 26 reads out and monitors the corresponding paper conveying time from the conveying time setting section 24. After the elapse of the read-out set time, the print start request section 26 requests to start the printing operation to the print mechanism section 18. Practically speaking, in the printing operation, a video read signal is supplied from the mechanism control section 16 to the main control section 14, the writing operation is requested, the video data to produce the print pattern from the main control section 14 is received, and the writing of the video data onto the photo sensitive drum by the print mechanism section 18 is started.

Figure 4:
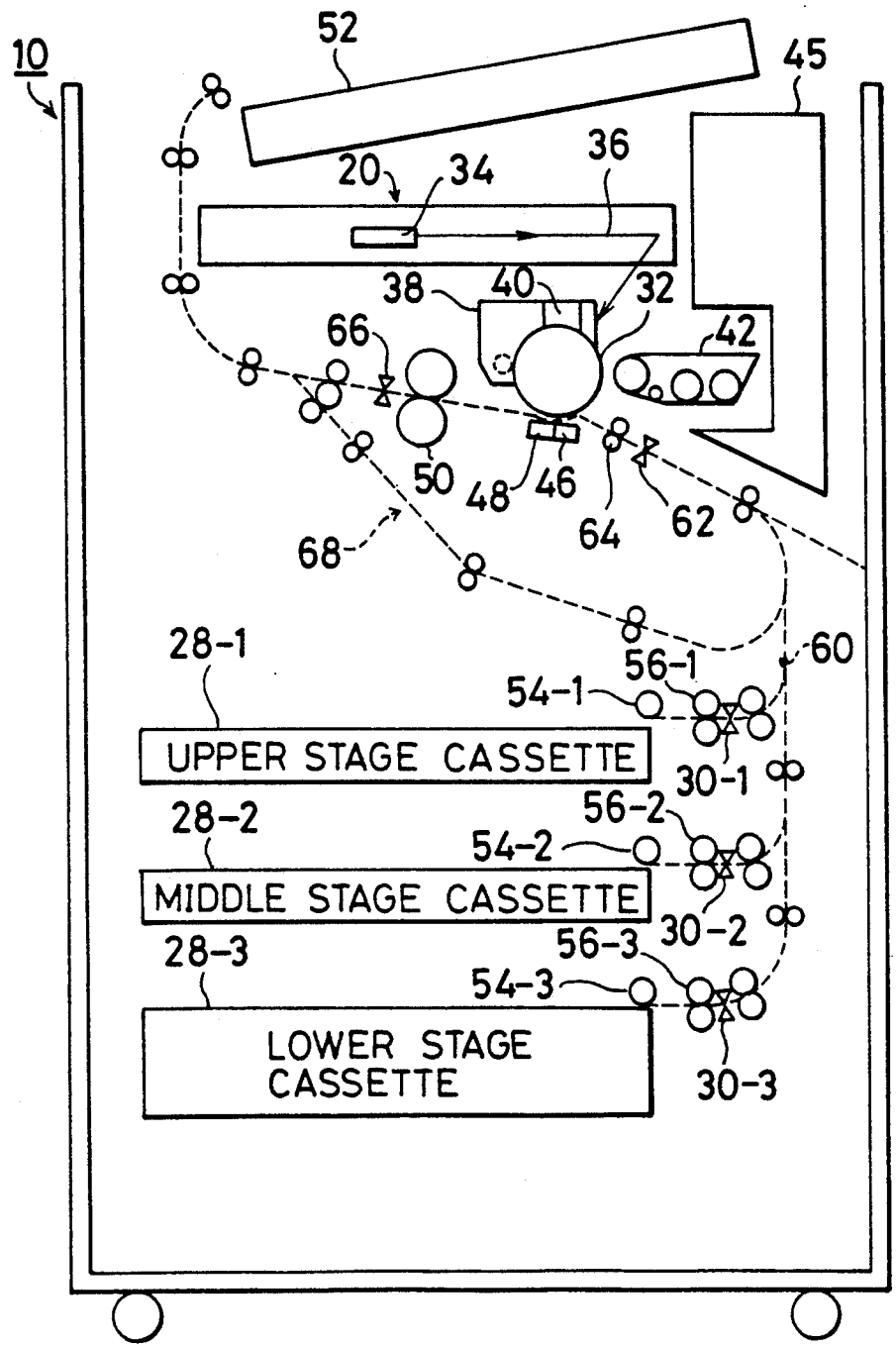
FIG. 4 is an explanatory diagram of an internal mechanism of a laser printer which is used in the present invention.

FIG. 4 is an explanatory diagram of an internal mechanism of the laser printer 10 of FIG. 3. In FIG. 3, an upper stage cassette 28-1, a middle stage cassette 28-2, and a lower stage cassette 28-3 are provided as paper feeding apparatuses in the laser printer 10. Pickup rollers 54-1, 54-2, and 54-3 are provided on the paper take-up sides of the upper, middle, and lower stage cassettes 28-1 to 28-3, respectively. Feeder rollers 56-1, 56-2, and 56-3 are subsequently provided. To execute the paper feeding operation by the selection of either one of the cassettes 28-1 to 28-3, the corresponding one of the pickup rollers 54-1 to 54-3 and the corresponding one of the feed rollers 56-1 to 56-3 are selected on the basis of a pickup instruction signal and the selected rollers are driven by motors.

The paper sensors 30-1 to 30-3 are provided after the feed rollers 56-1 to 56-3. The paper sensors 30-1 to 30-3 are provided at the positions of the same distance from the take-up positions of the cassettes 28-1 to 28-3. The cut sheet fed out from either one of the upper, middle, and lower stage cassettes 28-1 to 28-3 passes along an independent path shown by a broken line. After that, the paper merges and is sent to the printing position.

As a laser printer printing mechanism, the surface of the photo sensitive drum 32 is charged by a charging device 40 provided for the drum unit 38. A latent image corresponding to the print pattern is formed onto the drum 32 by the irradiation of the laser beam 36 from the semiconductor laser 34 provided for the optical system 20. After the latent image was formed, a toner is supplied from a toner supply section 45 by the developer 42 and the latent image is developed.

After completion of the development, the developed latent image is sent to the transfer unit 46 on the lower side and the print pattern is transferred onto the cut sheet which passes a portion between the drum 32 and the transfer unit 46. After the developed latent image was transferred onto the paper by the transfer unit 46, the paper is sent to the fixing unit 50. The fixing unit 50 is constructed by heat rollers and fuses and fixes the developing toner transferred on the cut sheet by the heat.

An erasing unit 48 is provided behind the transfer unit 46 and, for instance, discharges the charged surface remaining on the photo sensitive drum 32 by the light irradiation by using an LED arranged in a line.

A paper sensor 62 and a standby clutch 64 are provided in front of the printing position by the drum 32. During the printing operation of the cut sheet by the drum 32, the subsequent print paper is detected by the paper sensor 62, the standby clutch 64 is opened, and the feeding operation of the paper to the drum 32 is suppressed. After completion of the printing, the paper feeding operation to the drum 32 is executed at the timing to decide the print starting position or the like.

Further, a paper sensor 66 is also provided at an outlet of the fixing unit 50 and detects the end of printing of the cut sheet. When a paper jam occurs, the paper sensors 62 and 66 are also obviously commonly used as sensors to detect the paper position at which the paper jam occurs.

The cut sheet after completion of the printing is finally enclosed onto the output tray 52 provided in the upper portion.

A loop-shaped path is formed on the lower side where the paper doesn't pass through the portion under the photo sensitive drum 32. Such a path is a duplex path 68 and is used in case of printing image data onto both sides of the cut sheet.

It is now assumed that when the cut sheet reaches a predetermined position 60 of the paper conveying path corresponding to the printing position at which the photo sensitive drum 32 is attached, the writing operation to form a latent image onto the surface of the drum 32 is started. On this assumption, there are the following relations $$L_1 < L_2 < L_3$$

among distances $L_1$, $L_2$, and $L_3$ from the paper sensors 30-1 to 30-3 provided in correspondence to the upper, middle, and lower stage cassettes 28-1 to 28-3 to the position 60.

Assuming that a conveying speed of the cut sheet is constant, the conveying times $T_1$, $T_2$, and $T_3$ which are required when the cut sheet is conveyed from the paper sensors 30-1 to 30-3 to the position 60 can be predetermined. There are also obviously the relations of $T_1 < T_2 < T_3$. Such conveying times $T_1$ to $T_3$ have previously been registered in the conveying time setting section 24 of the mechanism control section 16 shown in FIG. 3.

Figure 5:
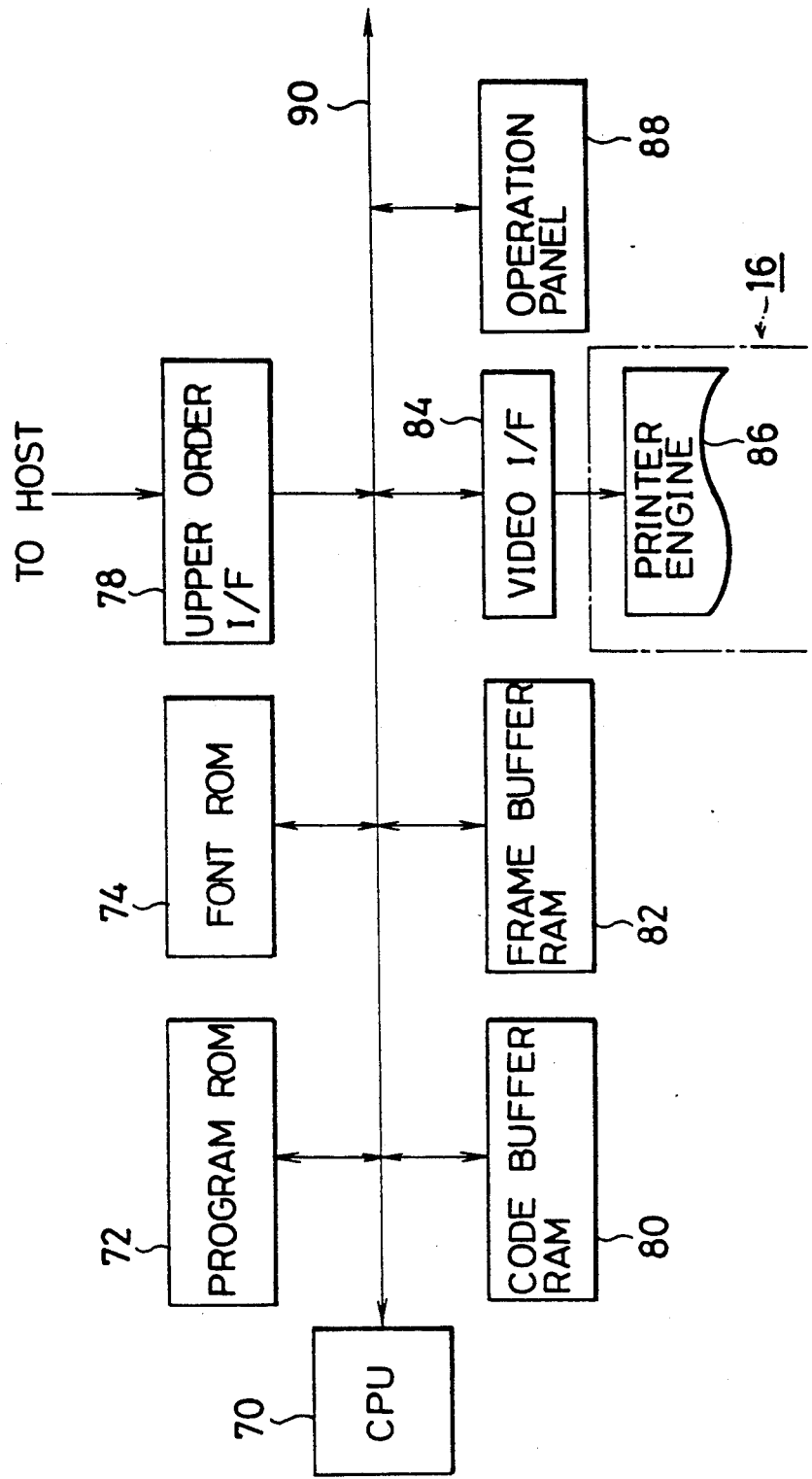
FIG. 5 is a block diagram showing a specific example of a control section in FIG. 3 in case of a low speed page printer as an example.

FIG. 5 is a block diagram showing a specific embodiment of the main control section 14 provided in the laser printer 10 shown in FIG. 3 with respect to a low speed page printer as an example.

In FIG. 5, a program ROM 72, a font ROM 74, an upper interface 78, a code buffer RAM 80, a frame buffer RAM 82, a video interface 84, and an operation panel 88 are connected to an internal bus 90 of a CPU 70. A printer engine 86 is connected to the video interface 84. The printer engine 86 constructs the mechanism control section 16 in FIG. 3.

In the printing operation in such a low speed page printer, when the CPU 70 receives a print command from the host computer 12 through the upper interface 78, the printing process is started in accordance with the program which has been read out from the program ROM 72 in an initial program routine. Subsequent to the print command, for instance, character codes or the like are sent as print data from the host computer 12. Therefore, those character codes are stored into the code buffer RAM 80 which functions as an intermediate buffer.

After that, the CPU 70 sequentially reads out print codes such as character codes or the like from the code buffer RAM 80 and accesses the font ROM 74 on the basis of the character codes and reads out, for instance, outline fonts and develops dot patterns into the frame buffer RAM 82. The outline font can be also developed into a dot pattern of proper print information such as figure, image, or the like other than the dot pattern of a character for the frame buffer RAM 82.

The dot patterns of one page which have been developed in the frame buffer RAM 82, namely, the print patterns are transferred to the printer engine 86 through the video interface 84 in accordance with a write request from the mechanism control section 16 side and are copy transferred and recorded onto the paper on a cut sheet unit basis by the laser printer mechanism.

The local operation such as power-on, power-off, or the like of the low speed laser printer can be executed from the operation panel 88.

Figure 6:
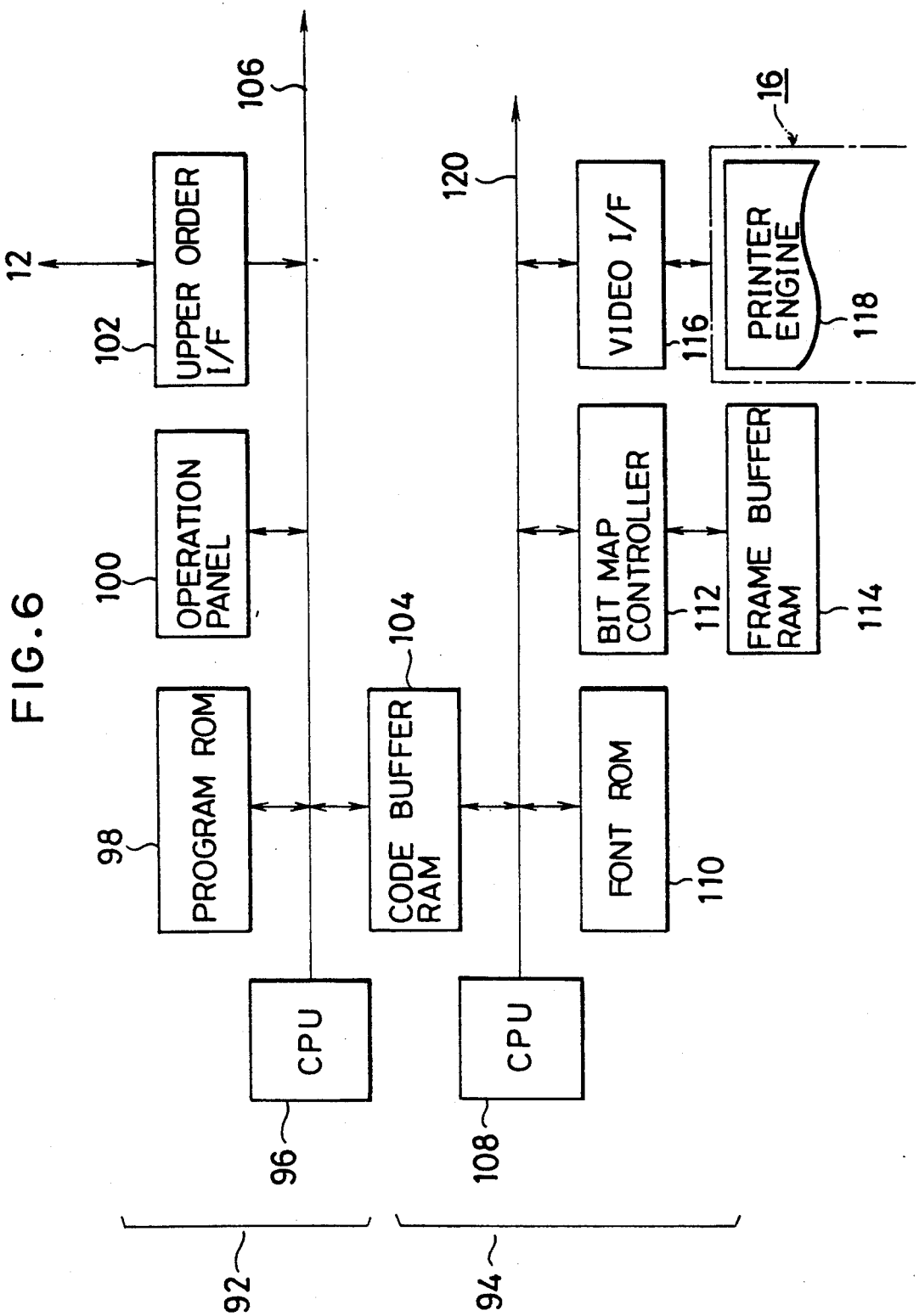
FIG. 6 is a block diagram showing a specific example of the control section of FIG. 3 in case of a high speed page printer as an example.

FIG. 6 is a block diagram showing a high speed page printer according to another embodiment of the main control section 14 in FIG. 3.

In FIG. 6, the high speed laser printer has two control processors of a reception editing processor 92 and a drawing control processor 94.

First, in the reception editing processor 92, a program ROM 98, an operation panel 100, an upper interface 102, and a code buffer RAM 104 using a 2-port RAM are connected to an internal bus 106 from a CPU 96.

On the other hand, in the drawing control processor 94, a font ROM 110, a bit map controller 112, a video interface 116, and the code buffer RAM 104 which is commonly used by the reception editing processor 92 are connected to an internal bus 120 of a CPU 108.

The bit map controller 112 is provided as a control firmware to control a frame buffer RAM 114. The development of a bit pattern into the frame buffer RAM 104 and the transfer to the printer engine 118 side are executed under special control of the bit map controller 112 irrespective of the CPU 108, thereby realizing a high processing speed.

In such a high speed page printer as mentioned above, by dividing the control construction into the receiving edition and the drawing control and by executing those processes in parallel, the printing process can be executed at a higher speed.

Figure 7:
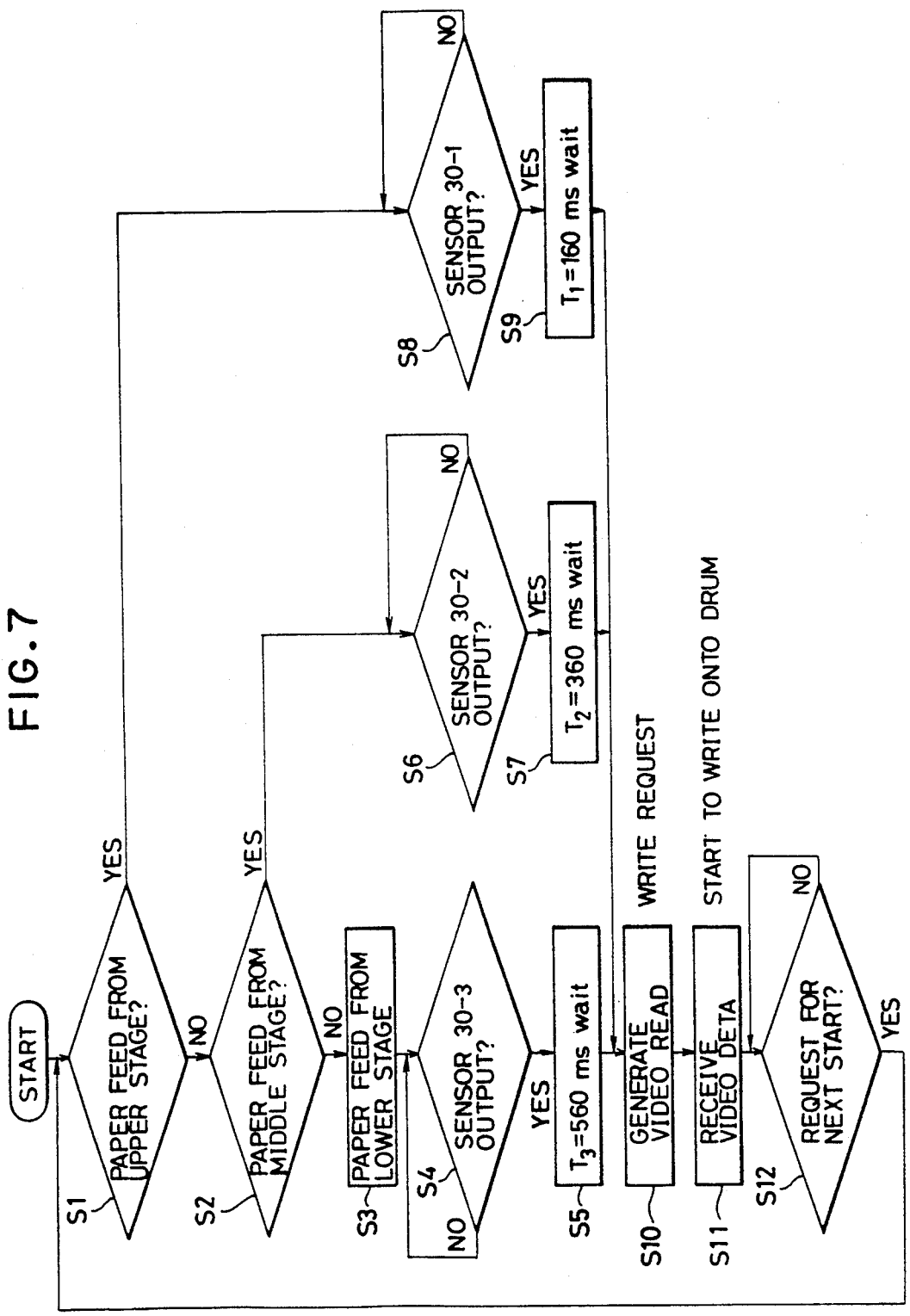
FIG. 7 is a flowchart showing a print control of the present invention.

The printing operation of the present invention will now be described with reference to the flowchart of FIG. 7.

In the embodiment of FIG. 3, when the print command including the designation of the paper size from the host computer 12 is received by the main control section 14, the print pattern (print video information) which has been developed to bit map data is prepared and the paper size is also notified to the mechanism control section 16. By receiving the notification of the paper size, the paper feed control section 25 of the mechanism control section 16 selects either one of the upper, middle, and lower stage cassettes 28-1 to 28-3 provided in the print mechanism section 18 and generates a pickup instruction signal at a predetermined timing and feeds out the paper of the designated size. On the assumption of the designation of the paper size as mentioned above, the writing control to the photo sensitive drum in association with the conveying operation of the paper shown in FIG. 7 is performed.

In step S1, a check is first made to see if the paper is fed from the upper stage cassette 28-1 or not. In step S2, a check is made to see if the paper is fed from the middle stage cassette 28-2 or not. In step S3, a check is made to see if the paper is fed from the lower stage cassette 28-3 or not. In case of feeding the paper from the lower stage cassette 28-3, step S4 follows and the arrival of the paper at the paper sensor 30-3 is monitored. When the arrival of the paper at the paper sensor 30-3 is detected, the apparatus waits for only the conveying time $T_3$, which has been preset in step S5, for example, $T_3 = 560$ msec. In step S10, a video read signal is supplied to the main control section 14 and the write request is instructed.

In response to the write request, the apparatus receives the video data as a video print pattern which has been developed into a dot pattern from the main control section 14 and the writing of the video data onto the photo sensitive drum is started in step S11. After completion of the writing, the apparatus waits for the start request of the next page in step S12.

On the other hand, when it is determined in step S2 that the paper is fed from the middle stage cassette 28-2, the arrival of the cut sheet at the paper sensor 30-2 is judged in step S6. When the arrival of the paper at the sensor 30-2 is determined in step S6, the apparatus waits for only the time $T_2$ which has been preset in step S7, for instance, $T_2 = 360$ msec. In step S10, a video read signal is supplied as a write request to the main control section 14. After that, the video data is received from the main control section 14 in step S11 and the writing to the photo sensitive drum is started.

Further, when it is decided in step S1 that the paper is fed from the upper stage cassette 28-1, step S8 follows and the arrival of the paper at the paper sensor 30-1 is judged. The apparatus waits for only the set time $T_1$ which has been preset in step S9, for instance, $T_1 = 160$ msec and the writing to the photo sensitive drum is started by the processes in steps S10 and S11.

Figure 8:
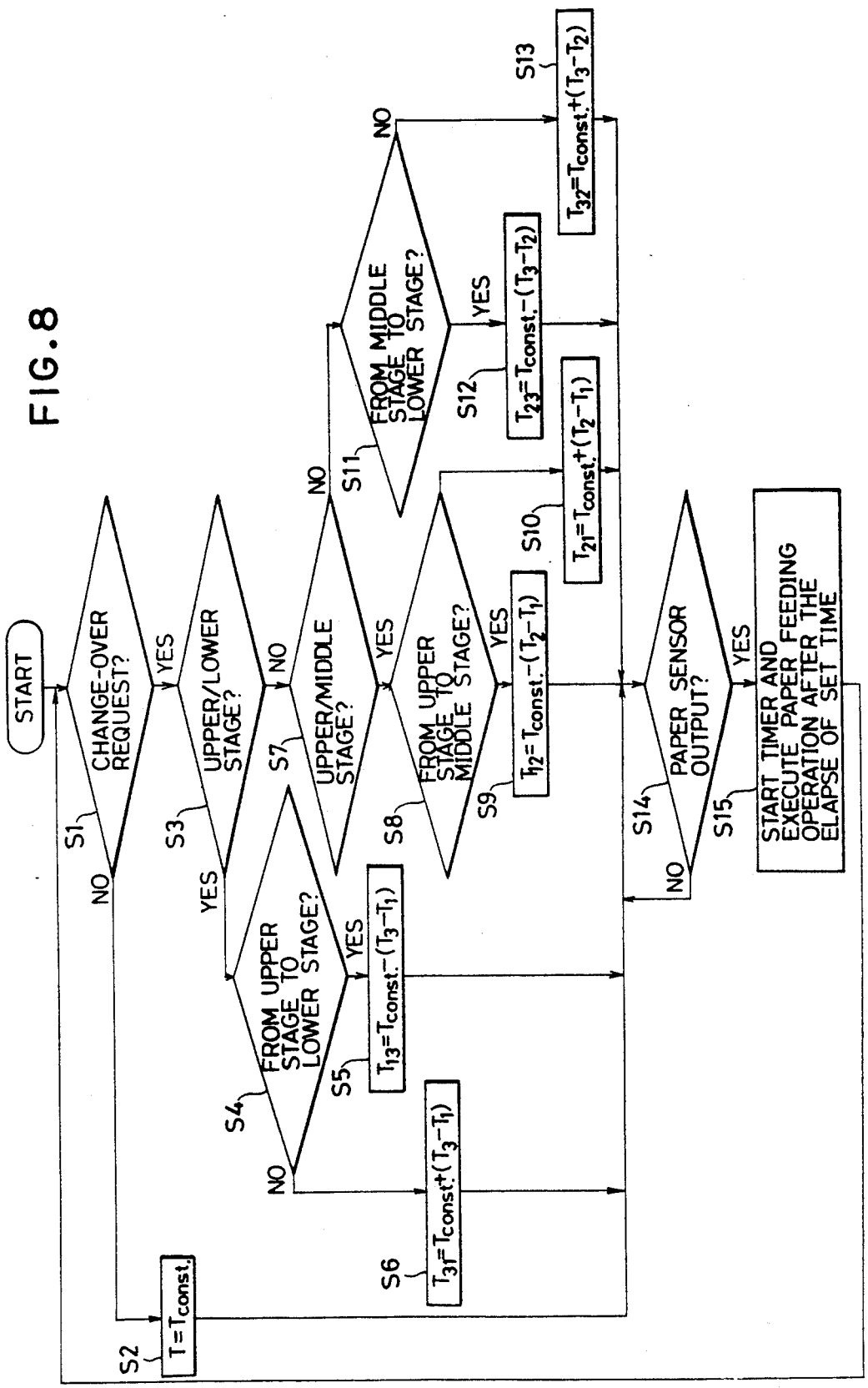
FIG. 8 is a flowchart showing a switching control of a paper feed of the present invention.

FIG. 8 is a flowchart for explaining the selection of the cassette and the paper feed control by the paper feed control section 25 provided in the mechanism control section 16 in FIG. 3.

According to the invention, even in the case where any one of the upper, middle, and lower stage cassettes 28-1 to 28-3 is selected, the printing operation of the paper can be always repeated at the same period. Further, even when the cassette is switched during the printing operation, the same printing period can be maintained. The reason why the same printing period is always obtained is because the paper feed timing is controlled to the optimum timing in accordance with the selection of the cassette on the basis of the flowchart of FIG. 8.

The paper feed control in case of continuously printing the image data in a state in which a special paper feed cassette was selected will be first explained. In step S1 in FIG. 8, the presence or absence of the change-over request of the cassette is judged. When there is no change-over request, step S2 follows and the time interval T to feed out the paper from the cassette is maintained to a predetermined time $T_{const}$. The processing routine advances to step S14 and the presence or absence of the detection signal from the paper sensor corresponding to the cassette selected at present is discriminated. When the paper is detected, step S15 follows and a timer is made operative. After the elapse of the predetermined time $T_{const}$ which has been set at present, the pickup instruction signal is supplied to the selected cassette, thereby allowing the paper feeding operation to be executed. The above processing routine is repeated.

FIGS. 9A to 9E are timing charts in the case where the upper stage cassette 28-1 is first selected and the paper is fed and the cassette is subsequently switched to the lower stage cassette 28-3 during the printing operation.

First, the operation in case of selecting the upper stage cassette 28-1 and feeding the paper will now be described with reference to FIGS. 9A to 9E. When the paper is fed out from the upper stage cassette 28-1 on the basis of the pickup instruction signal generated at time $t_1$ in FIG. 9A, the detection signal of the paper sensor 30-1 is subsequently obtained at time $t_2$ in FIG. 9B. As shown in FIG. 9E, the write timing signal rises and the writing to the photo sensitive drum is started at time $t_3$ after the elapse of the set time $T_1 = 160$ msec from the leading time $t_2$ of the detection signal of the paper sensor 30-1 and the image data is printed.

At time $t_4$ after the elapse of the predetermined time $T_{const}$ from the leading time $t_2$ of the detection signal of the paper sensor 30-1 in FIG. 9B, the next pickup instruction signal shown in FIG. 9A is generated, thereby allowing the paper feeding operation from the upper stage cassette 28-1 to be executed. On the basis of the detection of the paper sensor 30-1 at time $t_5$, the write timing signal is raised at time $t_6$ after the elapse of the set time $T_1 = 160$ msec, thereby starting the writing to the photo sensitive drum. So long as the upper stage cassette 28-1 is successively selected, the above operations are repeated and printing periods which are determined by a leading time interval from $t_3$ to $t_6$ of the write timing signal in FIG. 9E are set to a predetermined time $T_0$.

The operation in case of switching the paper feed cassette during the printing operation will now be described. It is now assumed that after the pickup instruction signal was generated at time $t_4$ in FIG. 9A, the change request to the lower stage cassette 28-3 is generated in association with the change in paper size during the printing operation of the paper fed out from the upper stage cassette 28-1. The conveying distance to the printing position increases due to the switching to the lower stage cassette 28-3. Therefore, the paper feed timing time just after the switching of the cassette is corrected from the predetermined time $T_{const}$ so far to a short time and the pickup instruction signal is generated to the lower stage cassette 28-3. That is, a paper feed timing time $T_{13}$ from time $t_5$ at which the detection signal of the paper sensor 30-1 due to the paper fed out from the upper stage cassette 28-1 is obtained to time $t_7$ at which the pickup signal in FIG. 9D is generated to feed the paper from the lower stage cassette 28-3 on the switching side is corrected from the predetermined time $T_{const}$ so far to a short time.

When the pickup instruction signal is supplied to the lower stage cassette 28-3 on the switching side and the paper feeding operation is executed at time $t_7$ after the elapse of the corrected paper feed timing time $T_{13}$, the detection signal is obtained from the paper sensor 30-3 in FIG. 9D at time $t_8$. The write timing signal in FIG. 9E is raised at time $t_9$ after the elapse of the set time $T_3 = 560$ msec which has been preset in correspondence to the lower stage cassette 28-3, the writing to the photo sensitive drum is started, and the image data is printed.

It is sufficient that the paper feed timing time $T_{13}$ which is used upon switching from the upper stage cassette 28-1 to the lower stage cassette 28-3 is set to be shorter than the predetermined time $T_{const}$ by only the time difference $(T_3 - T_1)$ between the set conveying time $T_1$ corresponding to the upper stage cassette 28-1 and the set conveying time $T_3$ corresponding to the lower stage cassette 28-3. That is, the paper feed timing time $T_{13}$ upon switching from the upper stage cassette 28-1 to the lower stage cassette 28-3 is obtained by the following equation (1).

$$T_{13} = T_{const} - (T_3 - T_1) \tag{1}$$

On the contrary, the paper feed timing time $T_{31}$ which is used upon switching from the lower stage cassette 28-3 to the upper stage cassette 28-1 is set to a long time as shown by the following equation (2).

$$T_{31} = T_{const} + (T_3 - T_1) \tag{2}$$

A switching process of the paper feed timing time will now be described with reference to the flowchart of FIG. 8. In step S3, a check is made to see if there is a cassette change-over request between the upper stage and the lower stage or not. If YES, step S4 follows and a check is made to see if there is a cassette change-over request from the upper stage to the lower stage or not. If YES in step S4, step S5 follows and the paper feed timing time $T_{13}$ which has previously been stored in a register or the like on the basis of the equation (1) is read out and set into the timer. A check is made in step S14 to see if there is a detection output of the paper sensor 30-1 or not. If YES, the timer is made operative in step S15 and the paper feeding operation is instructed after the elapse of time $T_{13}$.

Even when the paper feed cassette is switched from the upper stage cassette 28-1 to the lower stage cassette 28-3 as mentioned above, the repeating period of the write timing to the photo sensitive drum is held to the same period $T_0$ as the period $t_3$ to $t_6$ before switching as shown by a period $t_6$ to $t_9$ in FIG. 9E.

FIGS. 10A to 10E are timing chart for explaining a further extreme cassette switching operation.

The upper and lower stage cassettes are alternately switched each time one sheet of paper is fed. That is, the pickup instruction signal in FIG. 9A is generated at time $t_1$, thereby instructing the paper feeding operation from the upper stage cassette 28-1. When the detection signal of the paper sensor 30-1 in FIG. 10B is subsequently obtained at time $t_2$, the pickup instruction signal shown in FIG. 10C is generated at time $t_4$ after the elapse of the paper feed timing time $T_{31}$ to switch from the upper stage cassette 28-1 to the lower stage cassette 28-3, thereby allowing the paper feeding operation from the lower stage cassette 28-3 to be executed.

When the detection signal of the paper sensor 30-3 in FIG. 10D due to the paper fed out from the lower stage cassette 28-3 is subsequently obtained at time $t_5$, the pickup instruction signal in FIG. 10A is generated at time $t_7$ after the elapse of the paper feed timing time $T_{31}$ to switch from the lower stage cassette 28-3 to the upper stage cassette 28-1 from time $t_5$, thereby allowing the paper feeding operation from the upper stage cassette 28-1 to be executed.

In FIGS. 10A to 10E, each time one sheet of paper is fed, the paper feed from the upper stage cassette and the paper feed from the lower stage cassette are alternately switched. It is sufficient to alternately set the paper feed timing time to $T_{13}$ of the equation (1) and $T_{31}$ of the equation (2). In this case as well, as shown in FIG. 10E, the repeating period of the write timing to the photo sensitive drum is held to the predetermined time $T_0$.

The above point is also applied to the case of switching between the upper stage cassette 28-1 and the middle stage cassette 28-2. A paper feed timing time $T_{12}$ upon switching from the upper stage cassette 28-1 to the middle-stage cassette 28-2 is set to a short time as shown by the following equation (3).

$$T_{12} = T_{const} - (T_2 - T_1) \tag{3}$$

In this case, processes in steps S7 and S9 in FIG. 8 are executed. On the contrary, a paper feed timing time $T_{21}$ upon switching from the middle stage cassette 28-2 to the upper stage cassette 28-1 is set to a long time as shown the by the following equation (4).

$$T_{21} = T_{const} + (T_2 - T_1) \tag{4}$$

In this case, processes in steps S8 and S10 in FIG. 8 are executed.

Further, the same shall also apply to the case of switching between the middle steps cassette 28-2 and the lower stage cassette 28-3. A paper feed timing time $T_{23}$ upon switching from the middle stage cassette 28-2 to the lower stage cassette 28-3 is set to a short time as shown by the following equation (5).

$$T_{23} = T_{const} - (T_3 - T_2) \tag{5}$$

In this case, processes in steps S11 and S12 in FIG. 8 are executed. On the contrary, a paper feed timing time $T_{32}$ upon switching from the lower stage cassette 28-3 to the middle stage cassette 28-2 is set to a long time as shown by the following equation (6).

$$T_{32} = T_{const} + (T_3 - T_2) \tag{6}$$

In this case, processes in step S11 and S13 in FIG. 8 are executed.

According to the present invention as mentioned above, the paper sensors are individually provided at the positions of the same distance just after the paper feed cassettes. When the detection output of either one of the paper sensors is obtained, for instance, the writing to the photo sensitive drum is started after the elapse of the different conveying time which has been preset every paper feed cassette. Even when the paper feed cassette differs, therefore, the printing operation can be executed at the highest processing speed of the apparatus and the processing performance can be remarkably improved.

Numerical values of the set conveying times $T_1$ to $T_3$ corresponding to the cassettes in the above embodiment have merely been shown as an example and the present invention is not limited to those values.

Although the above embodiment has been described with respect to the example of the three stages of paper feed cassettes, the number of paper feed cassettes can be also set to a proper number as necessary.

Further, although the above embodiment has been described with respect to the example of the laser printer, the invention can be also similarly applied to other proper printers such as an LD printer using an electrophotographic method or a copying apparatus.

What is claimed is:

1. A paper feeding method comprising:
   a supplying step of supplying cut sheets from a plurality of paper feeding devices;
   a conveying time setting step of presetting conveying times such that cut sheets are moved from a plurality of paper detecting devices, each respectively attached to said plurality of paper feeding devices, to a predetermined conveying position, respectively;
   a paper feed control step of selecting one of said plurality of paper feeding devices and sending the cut sheet from the selected paper feeding device to said predetermined conveying position, using a paper feed control device;
   a conveying step of conveying the sheets fed out in said paper feed control step to a printing device for printing, and after printing, delivering the sheets from the printing device to an outside of the printing device;
   a print start request step of reading out and monitoring a corresponding paper conveying time which has been set in said conveying time setting step when a paper detection signal is generated by one of said paper detecting devices when the cut sheets pass therethrough from one of said plurality of paper feeding devices and requesting a print start to said printing device after the elapse of said set conveying time;
   a printing step of printing an image onto the cut sheet conveyed to the printing device on the basis of an instruction in said print start request step;
   a first instructing step of instructing a selected paper feeding device the same as a preceding paper feeding device to send the cut sheets to the predetermined conveying position after a predetermined amount of time ($T_{const}$) has elapsed starting from said paper feed control device receiving a paper detection signal generated by the paper detecting device corresponding to the preceding paper feeding device;
   a second instructing step of instructing a selected paper feeding device different from a preceding paper feeding device to send the cut sheets to the predetermined conveying position after a different amount of time has elapsed starting from said paper feed control device receiving a paper detection signal generated by the paper detecting device corresponding to the preceding paper feeding device; and
   a determining step of determining said different amount of time, using said paper feeding control device, so as to maintain the same printing period as that existing before switching to said different paper feeding device.

2. A method according to claim 1, wherein in said paper feed control step, in the case where the conveying time from the paper detecting device of the cut sheet supplied form the first paper feeding device to a print request start position is set to a first conveying time ($T_1$) and the conveying time from the paper detecting device of the cut sheet supplied from the second paper feeding device to the print request start position is set to a second conveying time ($T_2$) longer than the first conveying time ($T_1$), when the instruction to switch to the first paper feeding device is received during the supply of the cut sheet from the second paper feeding device, the paper feed after completion of said switching operation is instructed after the elapse of a time $$(T_{const}) + (T_2 - T_1)$$

after the paper detection signal of the cut sheet before said switching operation had been received from the second paper detecting device.

3. A method according to claim 2 wherein in said paper feed control step, one of said plurality of paper feeding device is selected on the basis of a paper size instructed from an upper-order apparatus and the paper feed is instructed.

4. A method according to claim 3, wherein in said printing step, a latent image optically formed on a photo sensitive drum is transferred onto the cut sheet by an electrophotographic method, and in said print start request step, the start to form the latent image is requested to said printing device.

5. A method according to claim 1, wherein in said paper feed control step, one of said plurality of paper feeding devices is selected on the basis of a paper size instructed from an upper-order apparatus and the paper feed is instructed.

6. A method according to claim 5, wherein in said printing step, a latent image optically formed on a photo sensitive drum is transferred onto the cut sheet by an electrophotographic method, and in said print start request step, the start to form the latent image is requested to said printing means.

7. A method according to claim 1, wherein in said paper feed control step, in the case where the conveying time from the paper detecting device of the cut sheet supplied from a first paper feeding device to a print request start position is set to a first conveying time ($T_1$) and the conveying time from the paper detecting device of the cut sheet supplied form a second paper feeding device to the print request start position is set to a second conveying time ($T_2$) longer than said first conveying time ($T_1$), when the instruction to switch to the second paper feeding device is received during the supply of the cut sheet from the first paper feeding means, the paper feed after completion of said switching operation is instructed after the elapse of time $$(T_{const}) - (T_2 - T_1)$$

after the paper detection signal of the cut sheet before said switching operation had been received from the first paper detecting device.

8. A printing apparatus comprising:
a plurality of paper feeding means each for supplying cut sheets;
printing means for printing an image onto the supplied cut sheets;
conveying means for individually conveying the supplied cut sheets from said plurality of paper feed means to said printing means and for delivering the cut sheets from the printing means to an outside of the printing means;
paper feed control means for selecting one of said plurality of paper feeding means to supply the cut sheets to the printing means and for instructing the selected paper feeding means to send the cut sheets to the conveying means;
a plurality of paper detecting means, each respectively attached at predetermined positions adjacent said plurality of paper feeding means, each for detecting a passage of one of the cut sheets from the respective paper feeding means therethrough;
conveying time setting means for presetting, for each said plurality of paper feeding means, conveying times of the cut sheets moving from the predetermined positions of said respective plurality of paper detecting means to a predetermined position of said printing means corresponding to the initiation of printing by said printing means; and
print start requesting means for reading out and monitoring the corresponding conveying times of said conveying time setting means when a paper detection signal is generated by one of said plurality of paper detecting means for requesting said printing means to begin printing after the elapse of said conveying times,
said paper feed control means further instructing a selected paper feeding means the same as a preceding paper feeding means to send the cut sheets to the conveying means after a predetermined amount of time ($T_{const}$) has elapsed starting from said paper feed control means receiving the paper detection signal generated by the paper detecting means corresponding to the preceding paper feeding means, and said paper feeding control means instructing a selected paper feeding means different from a preceding paper feeding means to send the cut sheets to the conveying means after a different amount of time has elapsed starting from said paper feed control means receiving the paper detection signal generated by the paper detecting means corresponding to the preceding paper feeding means, said different amount of time being determined by said paper feeding control means so as to maintain the same printing period as that existing before switching to said different paper feeding means.

9. An apparatus according to claim 8, wherein in the case where the conveying time from the paper detecting means of the cut sheet supplied from a first paper feeding means to the print request to start printing is set to a first conveying time ($T_1$) and the conveying time from the paper detecting means of the cut sheet supplied from a second paper feeding means to the print request to start printing is set to a second conveying time ($T_2$) longer than said first conveying time ($T_1$), when the instruction to switch the paper feeding means to the first paper feeding means is received during the supply of the cut sheet from the second paper feeding means, said paper feed control means instructs the selected first feeding means after the elapse of the different amount of time being $$(T_{const}) + (T_2 - T_1)$$

from when the paper detection signal of the cut sheet from the second paper detecting means is generated.

10. An apparatus according to claim 9, wherein said plurality of paper feeding means includes the cut sheets of different sizes, and said paper feed control means selects one of said plurality of paper feeding means on the basis of the paper size designated from an upper-order apparatus and instructs a paper feed from said selected paper feeding means to said conveying means.

11. An apparatus according to claim 10, wherein said printing means transfers a latent image optically formed on a photo sensitive drum into the cut sheet by an electrophotographic method, and said print start requesting means requests the printing means to start the formation of the latent image.

12. An apparatus according to claim 8, wherein said plurality of paper feeding means include the cut sheets of different sizes, and said paper feed control means selects one of said plurality of paper feeding means on the basis of the paper size designated from an upper-order apparatus and instructs a paper feed from said selected paper feeding means to said conveying means.

13. An apparatus according to claim 12, wherein said printing means transfers a latent image optically formed on a photo sensitive drum onto the cut sheet by an electrophotographic method, and said printing start requesting means requests the printing means to start the formation of the latent image.

14. An apparatus according to claim 8, wherein in the case where the conveying time from the paper detecting means of the cut sheet supplied from a first paper feeding means to the print request to start printing is set to a first conveying time ($T_1$) and the conveying time from the paper detecting means of the cut sheet supplied from a second paper feeding means to the print request to start printing is set to a second conveying time ($T_2$) longer than said first conveying time ($T_1$), when an instruction to switch the paper feeding means to the second paper feeding means is received during the supply of the cut sheet from the first paper feeding means, said paper feed control means instructs the selected second feeding means after the elapse of the different amount of time being $$(T_{const}) - (T_2 - T_1)$$

from when the paper detection signal of the cut sheet from the first paper detecting means is generated.

15. A paper feeding method comprising the steps of:
supplying cut sheets from a plurality of paper feeding devices;
printing an image onto the supplied cut sheets, using a printing device;
individually conveying, using a conveying device, the supplied cut sheets from the plurality of paper feeding devices to the printing device and delivering the cut sheets from the printing device to an exterior of the printing device;
selecting one of the plurality of paper feeding devices to supply the cut sheets to the printing device and instructing the selected paper feeding device to send the cut sheets to the conveying device, using a paper feed control device;
detecting a passage of one of the cut sheets through each of a plurality of paper detecting devices respectively attached at a predetermined position adjacent to the plurality of paper feeding devices;
presetting conveying times of the cut sheets moving from the predetermined positions of the respective plurality of paper detecting devices to a predetermined position of the printing device corresponding to the initiation of printing by the printing device, using a conveying time setting device;
reading out and monitoring the corresponding conveying times of the conveying time setting device when a paper detection signal is generated by one of the plurality paper detecting devices and for requesting the printing device to begin printing after the elapse of the conveying times;
instructing a selected paper feeding device the same as a preceding paper feeding device to send the cut sheets to the conveying device after a predetermined amount of time has elapsed starting from the paper feed control device receiving a paper detection signal generated by the paper detecting device corresponding to the preceding paper feeding device;
instructing a selected paper feeding device different from a preceding paper feeding device to send the cut sheets to the conveying device after a different amount of time has elapsed starting from the paper feed control device receiving a paper detection signal generated by the paper detecting device corresponding to the preceding paper feeding device; and
determining said different amount of time, using the paper feeding control device, so as to maintain the same printing period as that existing before switching to said different paper feeding device.

* * * * *

UNITED STATES PATENT AND TRADEMARK OFFICE
CERTIFICATE OF CORRECTION

PATENT NO. : 5,323,220  
DATED : June 21, 1994  
INVENTOR(S) : Megumi Yasuda

It is certified that error appears in the above-indentified patent and that said Letters Patent is hereby corrected as shown below:

```
Col. 13, line 6, "form the" should be --from a--;
        line 9, after "from", "the" should be --a--;
        line 11, "the" should be --said--;
        line 13, "first" should be --second--;
        line 14, "second" should be --first--;
        line 17, the "+" should be a -----;
        line 22, "second" should be --first--;
        line 23, "[2]" should be --1,--;
        line 45, "means" should be --device--;
        line 52, "form" should be --from--;
        line 56, "second" should be --first--;
        line 57, "first" should be --second--;
        line 58, "means" should be --device--;
        line 60, after "(Tconst)", the "-" should be a
--+--; and
        line 65, "first" should be --second--.
   Col. 14 line 65, "first" should be --second--; and
        line 67, the "+" should be a -----.
   Col. 15, line 5, "includes" should be --include--; and
```

UNITED STATES PATENT AND TRADEMARK OFFICE
CERTIFICATE OF CORRECTION

PATENT NO. : 5,323,220
DATED : June 21, 1994
INVENTOR(S) : Megumi Yasuda

It is certified that error appears in the above-indentified patent and that said Letters Patent is hereby corrected as shown below:

Col. 15, line 28, "printing" should be --print--.

Signed and Sealed this

Eighteenth Day of October, 1994

Attest:

BRUCE LEHMAN

Attesting Officer

Commissioner of Patents and Trademarks